(12) United States Patent
Ito

(10) Patent No.: US 6,649,231 B2
(45) Date of Patent: Nov. 18, 2003

(54) OPTICAL COMPENSATORY SHEET COMPRISING TRANSPARENT SUPPORT, ORIENTATION LAYER AND OPTICALLY ANISOTROPIC LAYER

(75) Inventor: Yoji Ito, Minami-ashigara (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 85 days.

(21) Appl. No.: 09/925,305

(22) Filed: Aug. 10, 2001

(65) Prior Publication Data

US 2002/0045015 A1 Apr. 18, 2002

(30) Foreign Application Priority Data

Aug. 10, 2000 (JP) ......................................... 2000-242344
Aug. 15, 2000 (JP) ......................................... 2000-246269

(51) Int. Cl.[7] ............................................... C09K 19/00
(52) U.S. Cl. ......................................... 428/1.3; 428/1.1
(58) Field of Search .......................... 428/1.1, 1.2, 1.21, 428/1.23, 1.25, 1.26, 1.28, 1.3

(56) References Cited

U.S. PATENT DOCUMENTS 5,579,140 A * 11/1996 Yamahara et al.
6,064,457 A * 5/2000 Aminaka ..................... 349/117

* cited by examiner

Primary Examiner—Mark F. Huff
Assistant Examiner—Jennifer R. Sadula
(74) Attorney, Agent, or Firm—Burns, Doane, Swecker & Mathis, LLP

(57) ABSTRACT

A liquid crystal display giving an excellent image without defects is proposed. The liquid crystal display is equipped with an optical compensatory sheet in which a transparent support, an orientation layer and an optically anisotropic layer formed from a liquid crystal compound are provided in this order. The orientation layer has a surface roughness of 0.1 to 2.0 nm.

20 Claims, No Drawings

OPTICAL COMPENSATORY SHEET COMPRISING TRANSPARENT SUPPORT, ORIENTATION LAYER AND OPTICALLY ANISOTROPIC LAYER

FIELD OF THE INVENTION

The present invention relates to an optical compensatory sheet comprising a transparent support, an orientation layer and an optically anisotropic layer formed from a liquid crystal compound. The invention also relates to an orientation film, an elliptically polarizing plate and a liquid crystal display.

BACKGROUND OF THE INVENTION

A liquid crystal display comprises a polarizing plate and a liquid crystal cell.

An optical compensatory sheet (phase retarder) is usually inserted between the polarizing plate and the liquid crystal cell to improve qualities of an image displayed by a TFT liquid crystal display of TN mode, as is described in Japanese Patent Provisional Publication No. 8(1996)-50206. The liquid crystal display having the optical compensatory sheet, however, is relatively thick.

Japanese Patent Provisional Publication No. 1(1989)-68940 discloses a liquid crystal display in which an optical compensatory sheet is provided on one face of a polarizing membrane and on the other face an elliptically polarizing plate having a protective film is provided. This liquid crystal display gives high front contrast, and its thickness is not too thick. However, the optical compensatory sheet in this display is liable to be warped (for example, by heat) to cause phase difference, and hence the liquid crystal display has poor durability. To improve the durability of the liquid crystal display, Japanese Patent Provisional Publication No. 7(1995)-191217 and European Patent No. 0,911,656 A2 disclose a liquid crystal display having an improved elliptically polarizing plate. In the display, an optical compensatory sheet comprising a transparent support and a thereon-provided optically anisotropic layer formed from a discotic compound is directly used as the protective film of the polarizing plate. This liquid crystal display has satisfying durability, and its thickness is not too thick.

The optical compensatory sheet is prepared by forming an orientation layer and an optically anisotropic layer in this order on a transparent support. The surface of the orientation layer is subjected to rubbing treatment (the surface is rubbed with, for example, cloth). The optically anisotropic layer is formed by the steps of: applying a liquid crystal compound on the orientation layer, aligning the molecules of the compound, and fixing the alignment. In the process of the rubbing treatment, the surface of the orientation layer is scraped, and the produced scrapings often aggregate to cause defects in the alignment of the liquid crystal compound. These defects lower the production yield of the optical compensatory sheet. For keeping a good production yield, Japanese Patent Provisional Publication No. 7(1995)-333613 discloses an attempt to remove the scrapings by means of an ultrasonic dust remover. This attempt solves the problem to a certain extent.

On a glass substrate of the liquid crystal cell, the optical compensatory sheet is laminated with an adhesive as a part (protective film) of the polarizing plate. In a practical production process, if a fault is found in the liquid crystal display in the step of product inspection, the polarizing plate is peeled from the glass substrate of the liquid crystal cell, and then the liquid crystal cell is reused because the cell is expensive. [Hereinafter, this step of peeling the polarizing plate from the glass substrate is referred to as the step of reworking.] In the step of reworking, the optically anisotropic layer of the optical compensatory sheet sometimes partially remains on the glass substrate. Actually, in the step of reworking, the interface between the orientation layer and the optically anisotropic layer is often destroyed, and also the orientation layer itself is often destroyed in its layer. The destruction of the interface can be prevented by the denatured polyvinyl alcohol described in Japanese Patent Provisional Publication No. 8(1996)-338913, and the destruction of the orientation layer can be also prevented, to a certain extent, by addition of the cross-linking agent described in Japanese Patent Provisional Publication No. 8(1996)-338913.

SUMMERY OF THE INVENTION

The scrapings produced in the rubbing treatment of the orientation layer impair the production yield of the optical compensatory sheet or the liquid crystal cell. Although the scrapings can be removed to a certain extent by means of an ultrasonic dust remover, the dust remover by no means directly inhibits the scrapings from being produced in the rubbing treatment. Since the liquid crystal display has been recently required to display an image more and more precisely, even a very small defect can not be allowed. Accordingly, a satisfying production yield of the liquid crystal display is hardly realized by the ultrasonic dust remover alone. On the other hand, if the liquid crystal cell is optically compensated by a thick optically anisotropic layer, a large distortion (stress) is applied on the orientation layer so that the film layer is often destroyed in the step of reworking.

An object of the present invention is to provide an orientation layer from which few scrapings are produced in the rubbing treatment, and thereby to reduce defects (caused by the scrapings) in the optical compensatory sheet or the liquid crystal display.

Another object of the invention is to provide a liquid crystal display having a large viewing angle, and an optical compensatory sheet or a polarizing plate having few defects.

A further object of the invention is to provide a liquid crystal display which has excellent displaying characters such as a large viewing angle and which can display an image with few defects.

The applicant has studied and finally found that the scrapings in the rubbing treatment can be reduced, while the aligning function of a conventional orientation layer is maintained, by controlling the surface roughness of the orientation layer. Further, the applicant assumes that the polymer of the orientation layer has such a low polymerization degree that interwindings among the polymer molecules are easily untied to break the film layer when a large stress is applied in the step of reworking. Therefore, it is thought that the destruction of the orientation layer can be prevented if a high polymer is used. However, the orientation layer must be subjected to the rubbing treatment to align molecules of a liquid crystal compound provided on the film. If the polymer of the orientation layer has a too high polymerization degree, large energy is needed for the rubbing treatment. According to the applicant's study, if two polymers having different polymerization degrees are used for the orientation layer, the optically anisotropic layer scarcely remains (i.e., the orientation layer is scarcely destroyed in its layer) in the step of reworking. Further, few scrapings are produced in the rubbing treatment from the orientation layer made of these two polymers.

The present invention provides an optical compensatory sheet which comprises a transparent support, an orientation layer and an optically anisotropic layer formed from a liquid crystal compound in the order, wherein the orientation layer has a surface roughness of 0.1 to 2.0 nm.

The invention also provides an orientation film for liquid crystal compound having a surface roughness of 0.1 to 2.0 nm.

The invention further provides an ellipsoidal polarizing plate comprising a polarizing membrane and an optical compensatory sheet laminated on at least one surface of the polarizing membrane, wherein the optical compensatory sheet comprises a transparent support, an orientation layer and an optically anisotropic layer formed from a discotic liquid crystal compound in the order, wherein the transparent support is a polymer film having a retardation in plane in the range of 20 to 200 nm, and a retardation along thickness direction in the range of 70 to 400 nm, and wherein the orientation layer has a surface roughness of 0.1 to 2.0 nm.

The invention furthermore provides a liquid crystal display comprising a liquid crystal cell and two polarizing plates placed on both sides of the cell, wherein at least one of the polarizing plates is the ellipsoidal polarizing plate defined in claim 13, said ellipsoidal polarizing plate being so placed that the side of the optical compensatory sheet faces the liquid crystal cell.

The applicant has succeeded in reducing the scrapings produced in the rubbing treatment by controlling the surface roughness of the orientation layer. If the orientation layer is formed from two polymers having different polymerization degrees, not only the scrapings is further reduced but also the optically anisotropic layer is prevented from partially remaining on the liquid crystal cell when the polarizing plate is peeled from the cell in the step of reworking. Since the invention reduces the scrapings, the production yield of the polarizing plate or the liquid crystal display is improved. Further, since the optical compensatory sheet (or polarizing plate) of the invention is subjected to the step of reworking without causing troubles, the liquid crystal cell is easily reused. Accordingly, the production cost of the liquid crystal display can be remarkably reduced by the invention.

DETAILED DESCRIPTION OF THE INVENTION

The orientation layer of the invention is characterized by having the surface roughness in the range of 0.1 to 2.0 nm, and thereby the scrapings in the rubbing treatment is reduced. Preferably, the orientation layer is formed from two polymers having different polymerization degrees. The surface roughness can be controlled by selecting the solvent of the coating solution for forming the orientation layer, by adjusting the viscosity of the coating solution and/or by adjusting the dry thickness of the film.

The optical compensatory sheet of the invention comprises a transparent support, an orientation layer and an optically anisotropic layer formed from a liquid crystal compound, piled up in this order. The optical compensatory sheet is characterized by the orientation layer whose surface roughness is controlled in the range of 0.1 to 2.0 nm. The orientation layer is preferably formed from two polymers having different polymerization degrees.

The liquid crystal compound is preferably a discotic compound. Examples of the discotic compound include low molecular weight discotic compounds (monomers) and polymers obtained by polymerization of polymerizable discotic compounds. The discotic compounds are generally categorized into two groups, namely, compounds having discotic liquid crystal phase (discotic nematic phase) and compounds not having discotic liquid crystal phase. The discotic compound generally shows negative birefringence, which is used in the optically anisotropic layer. The optical compensatory sheet having the optically anisotropic layer optically compensates the liquid crystal cell excellently.

[Orientation Layer]

The orientation layer of the invention is preferably an organic orientation layer which can be formed by coating method, since the coating method is advantageous in view of productivity. The orientation layer is characterized by having the surface roughness in the range of 0.1 to 2.0 nm. The orientation layer can be formed by the steps of: applying a coating solution comprising polymer material and a solvent, drying the applied solution, and subjecting the formed layer to the rubbing treatment.

The surface roughness can be controlled by selecting the solvent of the coating solution, by adjusting the viscosity of the coating solution, and/or by adjusting the dry thickness of the film. For example, the applied coating solution is dried so slowly that the resulting film layer can have enough thickness to cover roughness of the support, and thereby the surface of the orientation layer is made smooth. In more detail, the coated solution is dried at 10 to 35° C. for 10 to 60 seconds, and then further dried at 35 to 100° C. Further, apart from the drying condition, if the support is a film of transparent plastic such as triacetyl cellulose, the orientation layer having a dry thickness of 0.7 to 2.0 μm (preferably 0.7 to 1.5 μm, more preferably 0.85 to 1.5 μm, and most preferably 0.85 to 1.25 μm) has a very smooth surface.

The orientation layer is formed from one or more polymers. Preferably, the film is formed by cross-linking reaction of a mixture of these polymers. A cross-linking agent may be optionally added.

It is preferred to use two polymers having different polymerization degrees. If so, the smoothness of the orientation layer surface is further improved. Accordingly, troubles in the step of reworking are remarkably reduced if an optical compensatory sheet has an optically anisotropic layer provided on the orientation layer formed from such two polymers. The orientation layer may contain another polymer besides the two polymers having different polymerization degrees. Further, the film may be formed by crosslinking reaction of these polymers with a cross-linking agent.

Preferably, at least one of the polymers is crosslinkable by itself or with a cross-linking agent. Either polymers cross-linkable by themselves or polymers cross-linkable with a cross-linking agent can be used. From the polymers having cross-linkable functional groups, the orientation layer can be formed through the reaction caused by light, heat or pH change. Otherwise, the film can be formed through a cross-linking reaction of the polymers in-to which cross-linkable linking groups are introduced by a highly reactive compound (cross-linking agent).

The cross-linking reaction is usually conducted by the steps of: coating the transparent support with a coating solution containing the polymers or a mixture of the polymers and the cross-linking agent, and for example, heating the applied coating solution.

The cross-linking reaction may be performed at any step between the step of providing the orientation layer on the support and the final step for preparing the optical compensatory sheet, so long as the resultant compensatory sheet has satisfying durability. In consideration of aligning character of the liquid crystal compound in the optically anisotropic layer, the polymers of the orientation layer are fully cross-linked preferably after the molecules of the compound are aligned. In that case, the coating solution containing the polymers and the cross-linking agent is applied on the transparent support, heated to dry, and subjected to the rubbing treatment to form the orientation layer. A coating solution containing the liquid crystal compound is then applied on the thus-formed film, heated to a temperature above the nematic phase temperature, and cooled to form an optically anisotropic layer. The cross-linking reaction generally proceeds at the step of heating to dry for forming the orientation layer. However, if the heating temperature is not enough high, the cross-linking reaction further proceeds at the step of heating for forming the optically anisotropic layer.

Either polymers cross-linkable by themselves or polymers cross-linkable with a cross-linking agent can be used as the polymers for the orientation layer. Of course, polymers cross-linkable both by themselves and with a cross-linking agent are also usable. Examples of the polymers include polymethylmethacrylate, acrylic acid/methacrylic acid copolymer, styrene/maleinimide copolymer, polyvinyl alcohol and denatured polyvinyl alcohol, poly(N-methylolacrylamide), styrene/vinyltoluene copolymer, chlorosulfonated polyethylene, nitrocellulose, polyvinyl chloride, chlorinated polyolefin, polyester, polyimide, vinyl acetate/vinyl chloride copolymer, ethylene/vinyl acetate copolymer, carboxymethylcellulose, polyethylene, polymers such as polypropylene and polycarbonate, and compounds such as silane coupling agents. Preferred polymers are water-soluble polymers such as poly(N-methylolacrylamide), carboxymethylcellulose, gelatin, polyvinyl alcohol and denatured polyvinyl alcohol. More preferred polymers are gelatin, polyvinyl alcohol and denatured polyvinyl alcohol. Further preferred polymers are polyvinyl alcohol and denatured polyvinyl alcohol. It is most preferred to use two polyvinyl alcohols having different polymerization degrees.

The difference of the polymerization degrees is not less than 50, preferably not less than 250, and more preferably not less than 500. One of the polymers (lower polymer) has a polymerization degree of preferably 100 to 500, more preferably 150 to 350. The other (high polymer) has a polymerization degree of preferably 750 to 2,000, more preferably 850 to 1,500. The amount of the high polymer is in the range of preferably 0.5 to 50 wt. %, more preferably 5 to 30 wt. %, most preferably 7.5 to 25 wt. % based on the amount of the lower polymer. Each of the lower and higher polymers is preferably polyvinyl alcohol or a denatured polyvinyl alcohol. More preferably, one of the lower and higher polymers is a denatured polyvinyl alcohol and the other is polyvinyl alcohol.

As the polyvinyl alcohols, a polyvinyl alcohol having a saponification degree of 70 to 100% can be used. The saponification degree is preferably in the range of 80 to 100%, more preferably in the range of 85 to 95%. The polymerization degree is preferably in the range of 100 to 3,000.

As the denatured polyvinyl alcohol, a polyvinyl alcohol denatured by copolymerization, by chain transfer or by block polymerization can be used. Examples of the denaturing group used in the copolymerization denaturation include COONa, Si(OX)$_3$ (wherein X is a halogen atom), N(CH$_3$)$_3$.Cl, C$_9$H$_{19}$COO, SO$_3$, Na and C$_{12}$H$_{25}$. Examples of the denaturing group used in the chain transfer denaturation include COONa, SH and C$_{12}$H$_{25}$. Examples of the denaturing group used in the block polymerization denaturation include COOH, CONH$_2$, COOR (wherein R is an alkyl group) and C$_6$H$_5$.

Polyvinyl alcohol or a denatured polyvinyl alcohol preferably has a saponification degree of 80 to 100%, and more preferably has a saponification degree of 85 to 95%. The denatured polyvinyl alcohol is preferably denatured with an alkylthio group.

The denatured polyvinyl alcohol is preferably a polyvinyl alcohol denatured by the compound represented by the following formula:

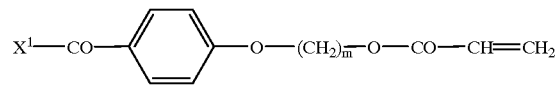

in which $R^1$ is an alkyl group, an acryloylalkyl group, a methacryloyl group or an epoxyalkyl group; W is a halogen atom, an alkyl group or an alkoxy group; X is an atom group forming an active ester, an acid anhydride or an acid halide; p is an integer of 0 or 1; and n is an integer of 0 to 4. Hereinafter, the polyvinyl alcohol denatured by the above compound is referred to as the particular denatured polyvinyl alcohol.

The particular denatured polyvinyl alcohol is further preferably a polyvinyl alcohol denatured by the compound represented by the formula (I):

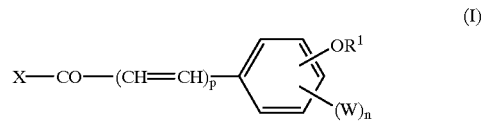

(I)

in which $X^1$ is an atom group forming an active ester, an acid anhydride or an acid halide; and m is an integer of 2 to 24.

A polyvinyl alcohol which is to react with the above compound is, for example, polyvinyl alcohol or a polyvinyl alcohol denatured by copolymerization, by chain transfer or by block polymerization. Preferred examples of the above particular denatured polyvinyl alcohol are described in detail in Japanese Patent Provisional Publication No. 9(1997)-152509. Japanese Patent Provisional Publication No. 8(1996)-338913 also describes in detail the synthesis method of the polymer, the measurement of the absorption spectrum in a visible region, and the amount of the introduced denaturing group.

Examples of the cross-linking agent used for the orientation layer include aldehydes, N-methylol compounds, dioxane derivatives, compounds which induce the cross-linking reaction when their carboxyl groups are activated, active vinyl compounds, active halogen compounds, isooxazoles, and dialdehyde starch. Examples of the aldehydes include formaldehyde, glyoxal and glutaraldehyde. Examples of the N-methylol compounds include dimethylol urea and methyloldimethylhyfantoin. Examples of the dioxane derivatives include 2,3-dihydroxydioxane. Examples of the compounds which induce the cross-linking reaction when their carboxyl groups are activated include carbenium, 2-naphthalenesulfonate, 1,1-bispyrrolidino-1-chloropyridinium and 1-morpholinocarbonyl-3-(sulfonatoaminomethyl). Examples of the active vinyl compounds include 1,3,5-triacryloyl-hexahydro-s-triazine, bis(vinylsulfone)methane and N,N'-methylenebis-[β-

(vinylsulfonyl)propioneamide]. Examples of the active halogen compounds include 2,4-dichloro-6-hydroxy-s-triazine. These can be used singly or in combination.

These compounds are preferably used with the above-described polymer, particularly a polyvinyl alcohol or a denatured polyvinyl alcohol (including the particular denatured polyvinyl alcohol). In consideration of productivity, a highly reactive aldehyde (particularly, glutaraldehyde) is preferred.

There is no particular restriction on the amount of the cross-linking agent. The more the cross-linking agent is used, the higher moisture resistance the resultant film has. However, if the agent is contained in an amount of 50 wt. % or more based on the amount of the polymers, the film has poor aligning function. Accordingly, the amount of the cross-linking agent is preferably in the range of 0.1 to 20 wt. %, more preferably in the range of 0.5 to 15 wt. % based on the amount of the polymers. After the cross-linking reaction, a small amount of non-reacted cross-linking agent generally remains in the orientation layer. The amount of the remaining agent is preferably not more than 1.0 wt. %, more preferably not more than 0.5 wt. %. If the agent remains in an amount of more than 1.0 wt. %, the resultant film has poor durability. A liquid crystal display equipped with such orientation layer often shows reticulation after it is used or left under a hot and humid condition for a long time.

The orientation layer of the invention can be formed by the steps of: coating a transparent support with a coating solution containing the above polymers or a coating solution containing the above polymers and the cross-linking agent, heating the applied solution to dry (to cross-link), and subjecting the dried layer to the rubbing treatment. As described above, the cross-linking reaction may be conducted at any time after the coating solution is applied. The orientation layer may be formed on an undercoating layer provided on the support. The orientation layer determines the aligning direction of the liquid crystal compound provided thereon.

An antifoaming organic solvent (e.g., methanol) or a mixture of that solvent and water is preferably used as a solvent of the coating solution for the orientation layer in the case that a polyvinyl alcohol or a denatured polyvinyl alcohol is used as the polymer. The weight ratio between the organic solvent and water in the mixture is generally in the range of 0:100 to 99:1, preferably in the range of 0:100 to 91:9. When the coating solution containing that solvent is applied on the support, bubbles are so reduced that aligning defects in the resultant organic film or optically anisotropic layer remarkably decrease. Further, that coating solution dries slowly.

The coating solution can be applied according to a conventional coating method such as a spin-coating method, a dip-coating method, a curtain method, an extrusion coating method, a bar coating method, or an E-type coating method. The E-type coating method is particularly preferred. The thickness of the orientation layer is in the range of preferably 0.1 to 10 $\mu$m, more preferably 0.5 to 5 $\mu$m, further preferably 0.7 to 1.5 $\mu$m, most preferably 0.85 to 1.25 $\mu$m.

The applied coating solution is heated and dried at a temperature of 20 to 110° C. For controlling the surface roughness of the orientation layer, the initial drying within 1.5 minute (preferably within 1 minute) after applying is important. The initial drying is preferably conducted while the temperature of the film is kept in the range of 20 to 40° C. (preferably in the range of 20 to 35° C.).

After the initial drying, the solution is further dried while the temperature of the film is preferably kept in the range of 50 to 100° C. (preferably 60 to 100° C., and more preferably 80 to 100° C.) to sufficiently cross-link the polymers with the cross-linking agent. The time for drying is in the range of 1 minute to 36 hours, preferably 5 to 30 minutes. The pH of the coating solution is set at the optimum value according to the cross-linking agent. If glutaraldehyde is used as the cross-linking agent, the pH is preferably in the range of 4.5 to 5.5, and more preferably the pH value is set at 5.

The rubbing treatment can be performed according to the conventional method widely used in a liquid crystal-aligning treatment process of liquid crystal display (LCD). In the method, the surface of the film is rubbed along a certain direction with paper, gauze, felt, rubber, nylon or polyester. The rubbing treatment is generally conducted by rubbing the film several times with cloth on which fibers having uniform thickness and length are evenly provided.

[Optically Anisotropic Layer]

The optically anisotropic layer formed from a liquid crystal compound is provided on the orientation layer. The liquid crystal compound is preferably a discotic compound. Preferably, the optically anisotropic layer shows negative birefringence and is formed from a compound comprising discotic structure units. In other words, the optically anisotropic layer is formed from a low molecular weight discotic liquid crystal compound (monomer) or a polymer obtained by polymerization of a polymerizable discotic liquid crystal compound.

Examples of the discotic compound include benzene derivatives described in C. Destrade et al, Mol. Crysr., vol. 71, page 111 (1981); truxene derivatives described in C. Destrade et al, Mol. Crysr., vol. 122, page 141 (1985) and Physics lett, A, vol. 78, page 82 (1990); cyclohexane derivatives described in B. Kohne et al., Angew. Chem., vol. 96, page 70 (1984); and macrocyclic compounds of azacrown or phenylacetylene described in J. M. Lehn et al., J. Chem. Commun., page 1794 (1985) and J. Zhang et al., J. Am. Chem. Soc., vol. 116, page 2655 (1994).

A so-called discotic liquid crystal is also usable. The discotic liquid crystal is a compound showing liquid crystal characters and comprising discotic structure units. In each structure unit, the above discotic compound is a center nucleus around which straight chain groups such as alkyl groups, alkoxy groups and substituted benzoyloxy groups are substituted. Besides the above compound, any compound can be used so long as the molecule itself is negative monoaxial and gives a certain alignment. The description "optically anisotropic layer formed from a discotic compound (liquid crystal compound)" does not means that the resultant layer always contains the above compounds. For example, in some cases, the above-described low molecular weight discotic liquid crystal compound has a group reactive with heat or light. The molecules of such compound are polymerized or cross-linked by heat or light to lose the liquid crystal characters, and hence the resultant layer contains the polymerized compound which is different from the initial low molecular weight discotic liquid crystal compound. Preferred examples of the above discotic compound are described in Japanese Patent Provisional Publication No. 8(1996)-50206.

Preferably, the optically anisotropic layer shows negative birefringence and is formed from a compound comprising discotic structure units. More preferably, each structure unit has a discotic plane inclined to the surface of the support, and the angle between the discotic plane and the support surface (inclined angle) gradually increases or decreases according to the depth (distance from the bottom of the layer). The inclined angle further preferably increases as the distance from the bottom increases. The inclined angle may continuously increases monotonically, continuously decreases monotonically, discontinuously increases monotonically, discontinuously decreases monotonically, continuously increases and decreases, or discontinuously increases and decreases. In the discontinuous changing, the inclined angle does not change at a certain region along the thickness direction. Even if so, the inclined angle preferably increases or decreases in total. It is more preferred to increase in total, and further preferred to increase continuously.

The optically anisotropic layer is generally formed by the steps of: coating the orientation layer with a coating solution comprising the discotic compound and other compounds dissolved in a solvent, drying the applied solution, heating to the discotic nematic phase-forming temperature, and then cooling the layer with the alignment (discotic nematic phase) maintained. Otherwise, the optically anisotropic layer is formed by the steps of: coating the orientation layer with a coating solution comprising the discotic compound and other compounds (and further, a polymerizable monomer and a photopolymerization initiator, for example) dissolved in a solvent, drying the applied solution, heating to the discotic nematic phase-forming temperature, polymerizing the molecules (for example, by exposure to UV rays), and then cooling the layer.

The temperature of phase transition between discotic nematic phase and solid phase of the discotic liquid crystal compound used in the invention is preferably in the range of 70 to 300° C., more preferably in the range of 70 to 170° C.

The inclined angles of structure units near the support (near the bottom of the layer) can be generally adjusted by selecting the discotic compound, material of the orientation layer and/or the method of the rubbing treatment. The inclined angles of structure units near the free surface facing to air (near the top of the layer) can be generally adjusted by selecting the discotic compound and other compounds used therewith. Examples of the compounds used with the discotic compound include plasticizer, surface active agent, and polymerizable monomer and polymer. The changing degree of the inclined angle can be also adjusted in the same manner.

As the plasticizer, the surface active agent or the polymerizable monomer used with the discotic compound, any compound compatible with the discotic compound can be used so long as it affects the changing of the inclined angle or it does not disturb the alignment. A polymerizable monomer (compound having vinyl group, vinyloxy group, acryloyl group or methacryloyl group) is preferred. That compound is used in an amount of preferably 1 to 50 wt. %, more preferably 5 to 30 wt. % based on the amount of the discotic compound.

As the polymer used with the discotic compound, any polymer compatible with the discotic compound can be used so long as it affects the changing of the inclined angle. Examples of the polymer include cellulose esters. Preferred examples of the cellulose esters include cellulose acetate, cellulose acetatepropionate, hydroxypropyl cellulose and cellulose acetatebutyrate. The polymer is added in an amount of 0.1 to 10 wt. % based on the amount of the discotic compound, so as not to disturb the alignment of the liquid crystal discotic compound. The amount of the polymer is preferably in the range of 0.1 to 8 wt. %, more preferably in the range of 0.1 to 5 wt. %.

The optical compensatory sheet of the invention preferably has a transparent support and a thereon-provided optically anisotropic layer formed from a compound comprising discotic structure units. The optically anisotropic layer is prepared by aligning the molecules of discotic compound and fixing the alignment. The discotic compound generally shows large birefringence, and its molecules are oriented in various alignment forms. Accordingly, an optical compensatory sheet obtained from the discotic compound has specific optical characteristics that cannot be obtained by the conventional stretched birefringent film.

The optical compensatory sheet obtained from the discotic compound is described in Japanese Patent Provisional Publication No. 6(1994)-214116, U.S. Pat. Nos. 5,583,679 and 5,646,703, and West German Patent No. 3,911,620 A1.

[Transparent Support]

As the transparent support, a polymer film having a light transmittance of 80% or more is preferably used in the invention. Preferably, the polymer film hardly shows birefringence even if external force is applied. Examples of the polymer film include films of cellulose polymers, norbornene polymers (e.g., Artone [trade name] from JSR co., Ltd. and Zeonex [trade name] from Nippon Zeon Co., Ltd.), and polymethylmethacrylate. Among the cellulose polymers, cellulose esters are preferred, and cellulose esters of lower fatty acids are more preferred. Here "lower fatty acids" means fatty acids having 6 or less carbon atoms. The number of carbon atoms is preferably 2 (cellulose acetate), 3 (cellulose propionate) or 4 (cellulose butyrate). Cellulose acetate is preferred, and examples of the cellulose acetate include diacetyl cellulose and triacetyl cellulose. Cellulose esters of mixed fatty acids such as cellulose acetatepropionate and cellulose acetatebutyrate are also usable.

The polymer for the support film has a viscosity average molecular weight (DP) of preferably not less than 250, more preferably not less than 290. The polymer also preferably has a narrow molecular weight distribution of Mw/Mn (Mw: weight average molecular weight, Mn: number average molecular weight) determined by gel permission chromatography. The value of Mw/Mn is preferably in the range of 1.0 to 1.7, more preferably in the range of 1.3 to 1.65, and most preferably in the range of 1.4 to 1.6.

As the polymer for the support film, cellulose acetate having an acetylation degree of 59.0 to 61.5% is preferably used.

The acetylation degree indicates an amount of acetic acid combined in a unit weight of cellulose, and is determined according to ASTM: D-817-91 (test for cellulose acetate).

[Retardation of Polymer Film for the Support]

Retardation values in plane (Re) and along the thickness direction (Rth) of the support film are defined by the following formulas (I) and (II):

$$Re = (nx - ny) \times d \quad \text{(I)}$$

$$Rth = [\{(nx + ny)/2\} - nz] \times d \quad \text{(II)}$$

in which nx is a refractive index in plane along the slow axis (i.e., along the direction giving the maximum refractive index); ny is a refractive index in plane along the traveling axis (i.e., along the direction giving the minimum refractive index); nz is a refractive index along the thickness direction of the support film; and d is a thickness of the support film in terms of nm.

The Re value is preferably in the range of 20 to 200 nm, more preferably in the range of 20 to 70 nm. The Rth value is preferably in the range of 70 to 400 nm.

[Retardation Increasing Agent]

The retardation of the support film is generally adjusted by external force (for example, by stretching the film). However, an aromatic compound having at least two aromatic rings can be also used as a retardation increasing agent (described in European Patent No. 0,911,656 A2).

The aromatic compound is used in an amount of 0.01 to 20 weight parts based on 100 weight parts of the polymer of the film. The amount of the aromatic compound is preferably in the range of 0.05 to 15 weight parts, more preferably in the range of 0.1 to 10 weight parts based on 100 weight parts of the polymer. Two or more aromatic compounds can be used.

The aromatic rings in the aromatic compound may be aromatic heterocyclic rings, as well as aromatic hydrocarbon rings.

It is particularly preferred that the aromatic hydrocarbon ring be 6-membered (namely, benzene ring).

The aromatic heterocyclic ring is generally unsaturated. The aromatic heterocyclic ring is preferably 5-, 6-or 7-membered (more preferably 5- or 6-membered). The aromatic heterocyclic ring generally has double bonds as many as possible. Preferred hetero-atoms are nitrogen, oxygen and sulfur. Nitrogen atom is particularly preferred. Examples of the heterocyclic ring include furan ring, thiophene ring, pyrrole ring, oxazole ring, isooxazole ring, thiazole ring, isothiazole ring, imidazole ring, pyrazole ring, furazane ring, triazole ring, pyran ring, pyridine ring, pyridazine ring, pyrimidine ring, pyrazine ring and 1,3,5-triazine ring.

Preferred aromatic rings are benzene ring, furan ring, thiophene ring, pyrrole ring, oxazole ring, thiazole ring, imidazole ring, triazole ring, pyridine ring, pyrimidine ring, pyrazine ring and 1,3,5-triazine ring. Benzene ring and 1,3,5-triazine ring are more preferred.

It is particularly preferred that the aromatic compound have at least one 1,3,5-triazine ring.

The number of the aromatic rings in the aromatic compound is preferably 2 to 20, more preferably 2 to 12, further preferably 2 to 8, and most preferably 3 to 6.

The relation of the aromatic rings is categorized into three cases, namely (a) the case in which the aromatic rings forms a condensed ring, (b) the case in which the aromatic rings are connected through a single bond, and (c) the case in which the aromatic rings are connected through a linking group. [In this case, a spiro-bonding is not formed because the rings are aromatic.]

The relation of the aromatic rings may be any of the cases (a) to (c).

Examples of the condensed ring in the case (a) include indene ring, naphthalene ring, azulene ring, fluorene ring, phenanthrene ring, anthracene ring, acenaphthylene ring, naphthacene ring, pyrene ring, indole ring, isoindole ring, benzofuran ring, benzothiophene ring, indolizine ring, benzoxazole ring, benzothiazole ring, benzimidazole ring, benztriazole ring, purine ring, indazole ring, chromene ring, quinoline ring, isoquinoline ring, quinolizine ring, quinazoline ring, cinnoline ring, quinoxaline ring, phthalazine ring, pteridine ring, carbazole ring, acridine ring, phenanthridine ring, xanthene ring, phenazine ring, phenothiazine ring, phenoxthine ring, phenoxazine ring and thianthrene ring. Preferred are naphthalene ring, azulene ring, indole ring, benzoxazole ring, benzothiazole ring, benzimidazole ring, benztriazole ring and quinoline ring.

The single bond in the case (b) is preferably between carbon atoms of the two aromatic rings. Two or more single bonds may connect the two aromatic rings to form an aliphatic ring or a non-aromatic ring between them.

The linking group in the case (c) is also preferably between carbon atoms of the two aromatic rings. The linking group is preferably an alkylene group, an alkenylene group, an alkynylene group, —CO—, —O—, —NH—, —S— and a combination thereof.

Examples of the linking group formed by the combination are shown below. In each of the following examples, the right and left terminals may be reversed.

c1: —CO—O—
c2: —CO—NH—
c3: -alkylene-O—
c4: —NH—CO—NH—
c5: —NH—CO—O—
c6: —O—CO—O—
c7: —O-alkylene-O—
c8: —CO-alkenylene-
c9: —CO-alkenylene-NH—
c10: —CO-alkenylene-O—
c11: -alkylene-CO—O-alkylene-O—CO-alkylene-
c12: —O-alkylene-CO—O-alkylene-O—CO-alkylene-O—
c13: —O—CO-alkylene-CO—O—
c14: —NH—CO-alkenylene-
c15: —O—CO-alkenylene- The aromatic ring and the linking group may have substituent groups.

Examples of the substituent group include halogen atoms (F, Cl, Br, I), hydroxyl, carboxyl, cyano, amino, nitro, sulfo, carbamoyl, sulfamoyl, ureido, an alkyl group, an alkenyl group, an alkynyl group, an aliphatic acyl group, an aliphatic acyloxy group, an alkoxy group, an alkoxycarbonyl group, an alkoxycarbonylamino group, an alkylthio group, an alkylsulfonyl group, an aliphatic amide group, an aliphatic sulfoneamide group, an aliphatic substituted amine group, an aliphatic substituted carbamoyl group, an aliphatic substituted sulfamoyl group, an aliphatic substituted ureido group and a non-aromatic heterocyclic group.

The alkyl group preferably has 1 to 8 carbon atoms. A chain alkyl group is preferred to a cyclic one, and a straight chain alkyl group is particularly preferred. The alkyl group may further have a substituent group (e.g., hydroxyl, carboxy, an alkoxy group, an alkyl-substituted amino group). Examples of the (substituted) alkyl group include methyl, ethyl, n-butyl, n-hexyl, 2-hydroxyethyl, 4-carboxybutyl, 2-methoxyethyl and 2-diethylaminoethyl.

The alkenyl group preferably has 2 to 8 carbon atoms. A chain alkenyl group is preferred to a cyclic one, and a straight chain alkenyl group is particularly preferred. The alkenyl group may further have a susbstituent group. Examples of the alkenyl group include vinyl, allyl and 1-hexenyl.

The alkynyl group preferably has 2 to 8 carbon atoms. A chain alkynyl group is preferred to a cyclic one, and a straight chain alkynyl group is particularly preferred. The alkynyl group may further have a susbstituent group. Examples of the alkynyl group include ethynyl, 1-butynyl and 1-hexynyl.

The aliphatic acyl group preferably has 1 to 10 carbon atoms. Examples of the aliphatic acyl group include acetyl, propanoyl and butanoyl.

The aliphatic acyloxy group preferably has 1 to 10 carbon atoms. Examples of the aliphatic acyloxy group include acetoxy.

The alkoxy group preferably has 1 to 8 carbon atoms. The alkoxy group may further have a susbstituent group (e.g., another alkoxy group). Examples of the (substituted) alkoxy group include methoxy, ethoxy, butoxy and methoxyethoxy.

The alkoxycarbonyl group preferably has 2 to 10 carbon atoms. Examples of the alkoxycarbonyl group include methoxycarbonyl and ethoxycarbonyl.

The alkoxycarbonylamino group preferably has 2 to 10 carbon atoms. Examples of the alkoxycarbonylamino group include methoxycarbonylamino and ethoxycarbonylamino.

The alkylthio group preferably has 1 to 12 carbon atoms. Examples of the alkylthio group include methylthio, ethylthio and octylthio.

The alkylsulfonyl group preferably has 1 to 8 carbon atoms. Examples of the alkylsulfonyl group include methanesulfonyl and ethanesulfonyl.

The aliphatic amide group preferably has 1 to 10 carbon atoms. Examples of the aliphatic amide group include acetoamide.

The aliphatic sulfoneamide group preferably has 1 to 8 carbon atoms. Examples of the aliphatic sulfoneamide group include methanesulfoneamide, butanesulfoneamide and n-octanesulfoneamide.

The aliphatic substituted amine group preferably has 1 to 10 carbon atoms. Examples of the aliphatic substituted amine group include dimethylamino, diethylamino and 2-carboxyethyl amino.

The aliphatic substituted carbamoyl group preferably has 2 to 10 carbon atoms. Examples of the aliphatic substituted carbamoyl group include methylcarbamoyl and diethylcarbamoyl.

The aliphatic substituted sulfamoyl group preferably has 1 to 8 carbon atoms. Examples of the aliphatic substituted sulfamoyl group include methylsulfamoyl and diethylsulfamoyl.

The aliphatic substituted ureido group preferably has 2 to 10 carbon atoms. Examples of the aliphatic substituted ureido group include methylureido.

Examples of the non-aromatic heterocyclic group include piperidino and morpholino.

The retardation increasing agent has a molecular weight of 300 to 800.

[Preparation of Polymer Film for the Support]

The polymer film for the support is prepared preferably according to a solvent casting method, in which the film is formed from a solution (dope) containing polymer material dissolved in an organic solvent. A film of cellulose acetate is preferably used as the polymer film for the support, and hence the process for preparing the support film of cellulose acetate is described below in detail.

The organic solvent used in the dope is preferably selected from the group consisting of an ether having 3 to 12 carbon atoms, a ketone having 3 to 12 carbon atoms, an ester having 3 to 12 carbon atoms and a halogenated hydrocarbon having 1 to 6 carbon atoms.

The ether, the ketone and the ester may have cyclic structures. The compound having two or more functional groups of ether, ketone and ester (—O—, —CO— and —COO—) is also usable as the organic solvent. In that case, the number of carbon atoms may be in the range described above for any functional group contained in the compound. The compound of the organic solvent may have other functional groups such as an alcoholic hydroxyl.

Examples of the ether having 3 to 12 carbon atoms include di-isopropyl ether, dimethoxymethane, dimethoxyethane, 1,4-dioxane, 1,3-dioxolan, tetrahydrofuran, anisole and phenetole.

Examples of the ketone having 3 to 12 carbon atoms include acetone, methylethyl ketone, diethyl ketone, diisobutyl ketone, cyclohexanone and methylcyclohexanone.

Examples of the ester having 3 to 12 carbon atoms include ethyl formate, propyl formate, pentyl formate, methyl acetate, ethyl acetate and pentyl acetate.

Examples of the compound having two or more functional groups include 2-ethoxyethyl acetate, 2-methoxyethanol and 2-butoxyethanol.

The halogenated hydrocarbon has preferably one or two, more preferably one carbon atom. The halogen atom is preferably chlorine. The ratio of halogen atoms substituting hydrogen atom is preferably in the range of 25 to 75 mol %, more preferably in the range of 30 to 70 mol %, further preferably in the range of 35 to 65 mol %, most preferably in the range of 40 to 60 mol %. A typical example of the halogenated hydrocarbon is methylene chloride. A mixture of two or more organic solvents may be used.

The cellulose acetate solution (dope) can be prepared by an ordinary method, which is conducted at a temperature of 0° C. or above (room temperature or an elevated temperature). In fact, the solution can be obtained by a known process and apparatus of the ordinary solvent casting method. It is preferred to use a halogenated hydrocarbon (particularly, methylene chloride) as the organic solvent if the ordinary method is used.

The resultant solution contains cellulose acetate in an amount of 10 to 40 wt. %, preferably 10 to 30 wt. %. In the organic solvent (main solvent), additives described below may be beforehand added.

The organic solvent and cellulose acetate are mixed and stirred at room temperature (0 to 40° C.) to prepare the solution. For preparing the solution of high concentration, they may be stirred at a high temperature under a high pressure. In that case, the organic solvent and cellulose acetate are placed in a pressure container. After the container is sealed, the mixture is stirred under a high pressure at a temperature which is above the boiling point of the solvent at 1 atm but at which the solvent in the container does not boil. The temperature is usually 40° C. or above, preferably in the range of 60 to 200° C., more preferably in the range of 80 to 110° C.

The components of the solution (dope) may be roughly mixed and then poured into the container, or otherwise they may be successively added into the container. The container must be equipped with stirring means. A high pressure can be obtained by introducing an inert gas (such as nitrogen gas) into the container, or by heating to increase the vapor pressure of the solvent. After the container is sealed, the components may be added under a high pressure.

The container is preferably heated externally. For example, a jacket-type heating apparatus can be used. Otherwise, a liquid heated by an external plate heater may be circulated through a pipe provided around the container so as to heat the container.

The container is preferably equipped with a propeller mixer, and the propeller is preferably long enough to reach the inner wall of the container. At the pointed end of the propeller, a scratching spatula is preferably provided so as to renew a layer of the solution attached on the inner wall during the stirring.

The container may be equipped with meters such as a pressure gauge and a thermometer. In the container, the components are dissolved in a solvent. The prepared dope is cooled and then taken out of the container, or is taken out and then cooled by means of a heat exchanger.

The dope can be prepared according to a cooling dissolution method. If the cooling dissolution method is used, cellulose acetate can be dissolved in a solvent in which cellulose acetate is hardly dissolved by a normal dissolution method. Further, even in the case that cellulose acetate is dissolved in a solvent by a normal dissolution method, a homogeneous solution can be rapidly prepared by the cooling dissolution method.

First, in the cooling dissolution method, cellulose acetate is gradually added into an organic solvent with the mixture stirred at room temperature.

The amount of cellulose acetate is in the range of 10 to 40 wt. %, preferably 10 to 30 wt. %. The additives described below may be added to the mixture.

Second, the mixture is cooled to a temperature of −100 to −10° C. (preferably −80 to −10° C., more preferably −50 to −20° C., and most preferably −50 to −30° C.). For cooling the mixture, dry ice-methanol bath (−75° C.) or cooled ethylene glycol bath (−30 to −20° C.) can be used. The mixture of cellulose acetate and an organic solvent is cooled to solidify.

The cooling rate is preferably not slower than 4° C. per minute, more preferably not slower than 8° C. per minute, most preferably not slower than 12° C. per minute. The faster the cooling rate is, the more it is preferred. However, a theoretical upper limit of the cooling rate is 10,000° C. per second, a technical upper limit is 1,000° C. per second, and a practical upper limit is 100° C. per second. The cooling rate means the change of temperature at the cooling stage per the time taken to complete the cooling stage.

The cooled mixture is then warmed to a temperature of 0 to 200° C. (preferably 0 to 150° C., more preferably 0 to 120° C., most preferably 0 to 50° C.) to dissolve cellulose acetate in the organic solvent. The mixture may be left at room temperature or in a hot bath to warm.

The warming rate is preferably not slower than 4° C. per minute, more preferably not slower than 8° C. per minute, most preferably not slower than 12° C. per minute. The faster the warming rate is, the more it is preferred. However, a theoretical upper limit of the warming rate is 10,000° C. per second, a technical upper limit is 1,000° C. per second, and a practical upper limit is 100° C. per second. The warming rate means the change of temperature at the warming stage per the time taken to complete the warming stage.

Thus, a homogeneous solution can be obtained. If cellulose acetate is not completely dissolved in a solvent, the procedures from the cooling stage to the warming stage can be repeated twice or more times. It can be determined by observation whether cellulose acetate is completely dissolved or not.

The container used in the cooling dissolution method is preferably sealed to prevent contamination of water, which may be caused by dew condensation at the cooling stage. Further, the time taken to complete the cooling or warming stage can be shortened by conducting the cooling procedure under an increased pressure or by conducting the warming procedure under a reduced pressure, respectively. Accordingly, a container resisting pressure is preferably used to conduct the procedure under an increased or reduced pressure.

For example, by the cooling dissolution method, cellulose acetate (acetylation degree: 60.9%, viscosity average molecular weight: 299) is dissolved in methyl acetate in an amount of 20 wt. %. According to differential scanning calorimetry (DSC), this solution shows at about 33° C. a pseudo-phase transition point between gel and sol. The solution is homogeneous gel below the pseudo-phase transition point, and hence it must be stored at a temperature higher than 33° C. (preferably at about 43° C.). The pseudo-phase transition point depends on various conditions such as acetylation degree and viscosity average molecular weight of cellulose acetate, concentration of the solution and the organic solvent.

From the prepared cellulose acetate solution (dope), a cellulose acetate film can be formed by a solvent cast method. The above-described retardation increasing agent is preferably added into the dope.

The dope is cast on a drum or a band, and the solvent is evaporated to form a film. Before casting the solution, the concentration of the solution is preferably so adjusted that the solid content of the solution is in the range of 18 to 35 wt. %. The surface of the drum or band is preferably polished to give a mirror plane. The casting and drying procedures of the solvent cast method are described in U.S. Pat. Nos. 2,336,310, 2,367,603, 2,492,078, 2,492,977, 2,492,978, 2,607,704, 2,739,069, 2,739,070, British Patent Nos. 640,731, 736,892, Japanese Patent Publication Nos. 45(1970)-4554, 49(1974)-5614, Japanese Patent Provisional Publication Nos. 60(1985)-176834, 60(1985)-203430 and 62(1987)-115035.

The drum or band preferably has a surface temperature of not higher than 10° C. when the dope is cast thereon. After casting the solution, the dope is preferably dried with air for at least 2 seconds. The formed film is peeled off the drum or band, and may be further dried with air to remove the solvent remaining in the film. The temperature of the air can be gradually elevated from 100 to 160° C. The above-mentioned method is described in Japanese Patent Publication No. 5(1993)-17844. The time for casting and peeling procedures can be shortened by the method. For conducting this method, it is necessary that the cast dope set to gel on the drum or band.

A plasticizer can be added into the cellulose acetate film, so as to improve mechanical strength of the film and to shorten the time for drying. As the plasticizer, phosphoric esters and carboxylic esters are used. Examples of the phosphoric esters include triphenyl phosphate (TPP) and tricresyl phosphate (TCP). Typical examples of the carboxylic esters are phthalic esters and citric esters. Examples of the phthalic esters include dimethyl phthalate (DMP), diethyl phthalate (DEP), dibutyl phthalate (DBP), dioctyl phthalate (DOP), diphenyl phthalate (DPP) and diethylhexyl phthalate (DEHP). Examples of the citric esters include triethyl o-acetylcitrate (OACTE) and tributyl o-acetylcitrate (OACTB). Other carboxylic esters such as butyl oleate, methylacetyl ricinoleate, dibutyl sebacate and various trimellitic esters are also usable. Plasticizers of phthalic esters (DMP, DEP, DBP, DOP, DPP, DEHP) are preferably used, and DEP and DPP are particularly preferred.

The amount of the plasticizer is in the range of preferably 0.1 to 25 wt. %, more preferably 1 to 20 wt. %, most preferably 3 to 15 wt. % based on the amount of the cellulose ester.

The cellulose acetate film may contain various deterioration inhibitors (e.g., oxidation inhibitor, peroxide scavenger, radical inhibitor, metal deactivator, acid scavenger, amine). The deterioration inhibitor is described in Japanese Patent Provisional Publication Nos. 3(1991)-199201, 5(1993)-1907073, 5(1993)-194789, 5(1993)-271471 and 6(1994)-107854. The amount of the deterioration inhibitor is in the range of preferably 0.01 to 1 wt. %, more preferably 0.01 to 0.2 wt. % based on the amount of the solution (dope). If the amount is less than 0.01 wt. %, the effect of the deterioration inhibitor is hardly expected. On the other hand, if the amount is more than 1 wt. %, the deterioration inhibitor often bleeds out on the surface of the film. Preferred examples of the deterioration inhibitor include butylated hydroxytoluene (BHT) and tribenzylamine (TBA).

The retardation of the cellulose acetate film can be adjusted by stretching. In that case, the film is preferably stretched by 3 to 100%. The cellulose acetate film has a thickness of preferably 40 to 140 μm, more preferably 70 to 120 μm.

[Surface Treatment of Polymer Film for the Support]

The polymer film for the support is preferably subjected to a surface treatment. Examples of the surface treatment include saponification treatment, plasma treatment, flame treatment and ultraviolet (UV) treatment. The saponification treatment includes acid saponification treatment and alkali saponification treatment. The plasma treatment includes glow discharge treatment and corona discharge treatment. The polymer film preferably contains additives such as a ultraviolet absorber. An adhesive layer (undercoating layer) [described in Japanese Patent Provisional Publication No. 7(1995)-333433] may be provided on the polymer film. The thickness of the adhesive layer is preferably in the range of 0.1 to 2.0 μm, and more preferably in the range of 0.2 to 1.0 μm.

If the polymer film is made of cellulose acetate, the surface of the film is preferably subjected to saponification treatment so as to improve adhesion to the orientation layer. For keeping the smooth surface of the cellulose acetate film, the saponification treatment is preferred to the adhesive layer. In the saponification treatment, the film is preferably kept at a temperature below the glass transition point (Tg), namely at a temperature of not more than 150° C. When the optical compensatory sheet is used as a transparent protective film of the polarizing plate, good adhesion between the polymer film and the polarizing membrane is required. From this viewpoint, it is also preferred that the surface of the polymer film be subjected to the saponification treatment.

The process of alkali saponification treatment is described below in detail.

The alkali saponification treatment preferably comprises the steps of: immersing the cellulose acetate film in an alkali solution, neutralizing the film with an acidic solution, washing with water and drying. Examples of the alkali solution include aqueous solutions of potassium hydroxide and sodium hydroxide. The normality of hydroxyl ion in the alkali solution is preferably in the range of 0.1 to 3.0 N, more preferably in the range of 0.5 to 2.0 N. The alkali solution is kept at a temperature preferably in the range of 0 to 90° C., more preferably in the range of 40 to 70° C.

The polymer film after the surface treatment has a surface energy of preferably not less than 55 mN/m, more preferably in the range of 60 to 75 mN/m. The surface energy can be measured by the contact angle method, the wet heating method or the adsorption method (these methods are described in 'The basic theory and application of wetting (written in Japanese)', published by Realize Co., Ltd, 1989). The contact angle method is preferred. In that method, two solutions having known surface energies are dropped onto the film. The contact angle of each drop is measured, and the surface energy of the film is calculated from the measured contact angles. The contact angle is, by definition, an angle (including the drop) between the film surface and the tangent of the drop surface at their crossing point.

[Polarizing Plate]

A polarizing plate used in a liquid crystal display generally comprises a polarizing membrane and two transparent protective films placed on both sides of the membrane. As the polarizing membrane, various membranes are known. Examples of the polarizing membranes include an iodine polarizing membrane, a polyene polarizing membrane and a dichromatic dye polarizing membrane. The iodine polarizing membrane and the dye polarizing membrane are generally prepared from polyvinyl alcohol films.

The polarizing plate of the invention has the above-described optical compensatory sheet as one of the protective films. The other protective film may be a normal cellulose acetate film. The optical compensatory sheet which has few defects (caused by scrapings produced in rubbing treatment) and hence which scarcely gives troubles in the step of reworking is laminated on the polarizing membrane with adhesive to obtain the polarizing plate of the invention.

In the polarizing plate of the invention, the slow axis of the optical compensatory sheet and the transparent axis of the polarizing membrane are arranged according to the type of the liquid crystal display.

If the polarizing plate is used in the liquid crystal display of TN, MVA or OCB mode, the slow axis of the optical compensatory sheet is placed essentially parallel to the transparent axis of the polarizing membrane. On the other hand, if the liquid crystal display is a reflection type, they are preferably placed so that the angle between them may be 45°.

[Liquid Crystal Display]

The optical compensatory sheet of the invention or the polarizing plate having that compensatory sheet is advantageously used in a liquid crystal display. The liquid crystal display comprises a liquid crystal cell and two polarizing plates placed on both sides of the cell. The liquid crystal cell comprises two electrode substrates and liquid crystal provided between them.

In the case that the optical compensatory sheet of the invention is used in a liquid crystal display, one compensatory sheet is placed between the liquid crystal cell and one of the polarizing plates, or otherwise two compensatory sheets are provided so that each sheet may be placed between the liquid crystal cell and each polarizing plate.

In the case that the polarizing plate of the invention is used in a liquid crystal display, the optical compensatory sheet of the invention is used as a transparent protective film placed between the liquid crystal cell and the polarizing membrane. In this case, only one compensatory sheet may be used as a transparent protective film (provided between the liquid crystal cell and the polarizing membrane) of the polarizing plate (placed on one side of the cell), or two compensatory sheets may be used as transparent protective films (each of which is provided between the liquid crystal cell and the polarizing membrane) of the polarizing plates (placed on both sides of the cell).

The liquid crystal cell is preferably OCB mode, TN mode or MVA mode. In the cell of OCB mode, rod-like liquid crystal molecules are oriented in a bend alignment in which the molecules near the top and those near the bottom are essentially reversely (symmetrically) aligned. The liquid crystal display having that cell is described in U.S. Pat. Nos. 4,583,825 and 5,410,422. Since the rod-like liquid crystal molecules near the top and those near the bottom are symmetrically aligned, the liquid crystal cell of bend alignment mode has self-compensating function. Therefore, such mode is referred to as OCB (optically compensatory bend) mode. The liquid crystal display of bend alignment mode rapidly responds to signals. In the liquid crystal cell of TN mode, rod-like liquid crystal molecules are essentially horizontally oriented in a twisted alignment with a twist angle of 60 to 120°. The liquid crystal cell of TN mode is widely used in a color TFT liquid crystal display.

The invention is further described in the following examples. In the examples, surface roughness (Ra) of the orientation layer was measured by means of an AFM (atomic force microscope) [SPI3800N, Seiko Epson Instruments Co., Ltd.]. In the measurement, the cut-off value was set at 3.3 μm.

EXAMPLE 1

The following components were placed in a mixing tank, heated and stirred to dissolve, to prepare a cellulose acetate solution.

| Cellulose acetate solution | |
| --- | --- |
| Cellulose acetate (acetylation degree: 60.9%) | 100 weight parts |
| Triphenyl phosphate (plasticizer) | 7.8 weight parts |
| Biphenyldiphenyl phosphate (plasticizer) | 3.9 weight parts |
| Methylene chloride (first solvent) | 300 weight parts |
| Methanol (second solvent) | 54 weight parts |
| 1-Butanol (third solvent) | 11 weight parts |

In another mixing tank, 16 weight parts of the following retardation increasing agent, 80 weight parts of methylene chloride and 20 weight parts of methanol were placed, heated and stirred, to prepare a retardation increasing agent solution.

The cellulose acetate solution (488 weight parts) and the retardation increasing agent solution (11 weight parts) were mixed and stirred well to prepare a dope. The prepared dope contained the retardation increasing agent in the amount of 1.5 weight parts based on 100 weight parts of cellulose acetate.

Retardation Increasing Agent

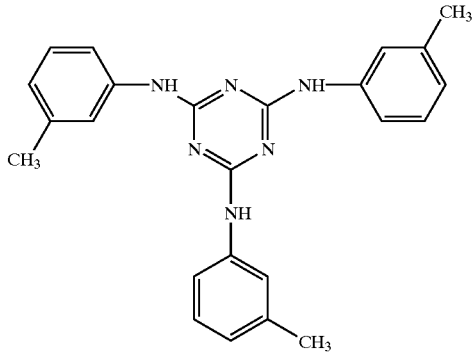

The obtained dope was cast on a band to form a film in which the solvent remained in the amount of 15 wt. %. The film was laterally stretched by 30% at 130° C. by means of a tenter. Thus, a cellulose acetate film (thickness: 80 μm) was prepared.

The retardation values of Re and Rth of the obtained cellulose acetate film were measured at 633 nm by means of an ellipsometer [M-150, JASCO], and thereby the values of Re and Rth were found 10 nm and 81 nm, respectively.

(Formation of Undercoating Layer)

On the above-prepared cellulose acetate film, the following coating solution was applied in the amount of 28 ml/m$^2$, and dried to form a gelatin layer (first undercoating layer) of 0.1 μm thickness.

| Coating solution for first undercoating layer | |
| --- | --- |
| Gelatin | 0.542 weight part |
| Formaldehyde | 0.136 weight part |
| Salicylic acid | 0.160 weight part |
| Acetone | 39.1 weight parts |
| Methanol | 15.8 weight parts |
| Methylene chloride | 40.6 weight parts |
| Water | 1.2 weight parts |

On the first undercoating layer, the following coating solution was applied in the amount of 7 ml/m$^2$, and dried to form a second undercoating layer.

| Coating solution for second undercoating layer | |
| --- | --- |
| The following anionic clpolymer | 0.079 weight part |
| Citric monoethyl ester | 1.01 weight parts |
| Acetone | 20 weight parts |
| Methanol | 87.7 weight parts |
| Water | 4.05 weight parts |

Anionic Copolymer

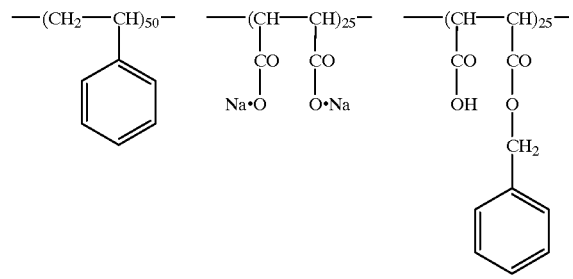

On the reverse surface of the film, the following coating solution was applied in the amount of 25 ml/m$^2$, and dried to form a backing layer.

| Coating solution for backing layer | |
| --- | --- |
| Cellulose diacetate (acetylation degree: 55%) | 0.656 weight part |
| Silica matting agent (mean grain size: 1 μm) | 0.065 weight part |
| Acetone | 67.9 weight parts |
| Methanol | 10.4 weight parts |

(Formation of Orientation Layer)

A coating solution of the following composition was coated on the above-formed gelatin layer on the cellulose acetate film by means of a wire bar coater of #16. The coating amount was 28 ml/m$^2$. The coated layer was dried with air at 25° C. for 60 seconds, further air dried at 60° C. for 60 seconds, and furthermore air dried at 90° C. for 150 seconds.

| Coating solution for orientation layer | |
| --- | --- |
| The following denatured polyvinyl alcohol | 20 weight parts |
| Water | 361 weight parts |

-continued

| Coating solution for orientation layer | |
|---|---|
| Methanol | 119 weight parts |
| Glutaric aldehyde (cross-linking agent) | 0.5 weight part |

Denatured Polyvinyl Alcohol

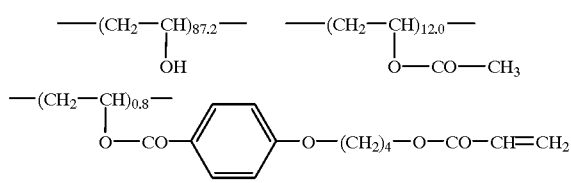

The formed orientation layer had a thickness of 1.1 μm. The surface roughness (Ra) was measured by means of an AFM (atomic force microscope) [SPI3800N, Seiko Epson Instruments Co., Ltd.], and thereby it was found 1.147 nm. The orientation layer was then subjected to a rubbing treatment in which the rubbing direction was parallel to the slow axis (measured at 632.8 nm) of the cellulose acetate film.

(Formation of Optically Anisotropic Layer)

To prepare a coating solution, 41.01 g of the following discotic (liquid crystal) compound, 4.06 g of ethylene oxide denatured trimethlolpropanetriacrylate (V#360, Osaka Organic Chemicals Co., Ltd.), 0.90 g of cellulose acetate butyrate (CAB-551-0.2, Eastman Chemical), 0.23 g of cellulose acetate butyrate (CAB-531-1, Eastman Chemical), 1.35 g of a photopolymerization initiator (Irgacure 907, Ciba-Geigy) and 0.45 g of a sensitizer (Kayacure DETX, Nippon Kayaku Co., Ltd.) were dissolved in 102 g of methyl ethyl ketone. The coating solution was then applied on the orientation layer by means of a wire bar coater of #4. The thus-treated film was fixed on a metal frame, and maintained in a thermostat at 130° C. for 2 minutes to align the molecules of the discotic compound. The film was then irradiated at 130° C. for 1 minute with an ultraviolet ray emitted from a high pressure mercury lamp of 120 W/cm, so as to polymerize the discotic compound. The film was cooled to room temperature. Thus, an optically anisotropic layer was formed.

The Re retardation value was measured at 633 nm, and found 48 nm. The average angle (inclined angle) between the discotic plane and the transparent support (cellulose acetate film) was 42°.

Discotic Liquid Crystal Compound

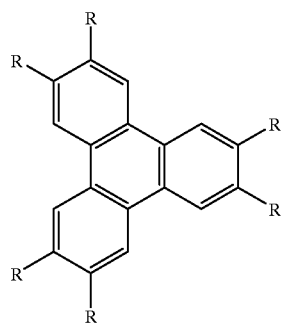

R: —O—CO—⟨phenyl⟩—O—(CH$_2$)$_4$—O—CO—CH=CH$_2$

The alignment was observed with a loupe (×100) to count the number of defects. As a result, the defects of 70 μm or more were found 1.3 per 1 m$^2$.

COMPARISON EXAMPLE 1

On the gelatin layer provided on the cellulose acetate film prepared in Example 1, a coating solution of the following composition was coated by means of a wire bar coater of #16. The coating amount was 28 ml/m$^2$. The coated layer was dried with air at 60° C. for 60 seconds, and further air dried at 90° C. for 150 seconds.

| Coating solution for orientation layer | |
|---|---|
| Denatured polyvinyl alcohol (MP203, Kuraray Co., Ltd.) | 10 weight parts |
| Water | 245 weight parts |
| Methanol | 245 weight parts |
| Glutaric aldehyde (cross-linking agent) | 0.5 weight part |

The formed orientation layer had a thickness of 0.5 μm. The surface roughness (Ra) was measured by means of an AFM (atomic force microscope) [SPI3800N, Seiko Epson Instruments Co., Ltd.], and thereby it was found 2.664 nm. The orientation layer was then subjected to a rubbing treatment in which the rubbing direction was parallel to the slow axis (measured at 632.8 nm) of the cellulose acetate film.

(Formation of Optically Anisotropic Layer)

On the orientation layer, an optically anisotropic layer was formed in the same manner as in Example 1.

The Re retardation value was measured at 633 nm, and found 48 nm. The average angle (inclined angle) between the discotic plane and the transparent support (cellulose acetate film) was 42°, which was the same as that in Example 1.

The defects in the alignment was counted in the same manner as in Example 1. As a result, the defects of 70 μm or more were found 20.3 per 1 m$^2$.

EXAMPLE 2

The procedure of Example 1 was repeated except that the retardation increasing agent was incorporated in the amount of 3.0 weight parts based on 100 weight parts of cellulose acetate, to prepare a dope. The dope was cast on a band to form a film in which the solvent remained in the amount of 15 wt. %. The film was laterally stretched by 30% at 130° C. by means of a tenter. Thus, a cellulose acetate film (thickness: 80 μm) was prepared.

The retardation values of Re and Rth of the obtained cellulose acetate film were measured at 633 nm by means of an ellipsometer [M-150, JASCO], and thereby the values of Re (along the stretched direction) and Rth were found 20 nm and 130 nm, respectively.

(Formation of Undercoating Layer)

A undercoating layer was formed on the above-prepared cellulose acetate film in the same manner as in Example 1.

(Formation of Orientation Layer)

A coating solution of the following composition was coated on the gelatin layer on the cellulose acetate film by means of an E coater. The coating amount was 56 ml/m². The coated layer was dried with air for 90 seconds so that the temperature of the layer might be 35° C., and further air dried at 90° C. for 150 seconds.

| Coating solution for orientation layer | |
|---|---|
| The denatured polyvinyl alcohol used in Example 1 | 13.5 weight parts |
| Polyvinyl alcohol (PVA117, kuraray Co., Ltd.) | 1.5 weight part |
| Water | 371 weight parts |
| Methanol | 119 weight parts |
| Glutaric aldehyde (cross-linking agent) | 0.5 weight part |

The formed orientation layer had a thickness of 1.5 $\mu$m. The surface roughness (Ra) was measured by means of an AFM (atomic force microscope) [SPI3800N, Seiko Epson Instruments Co., Ltd.], and thereby it was found 0.664 nm. The orientation layer was then subjected to a rubbing treatment in which the rubbing direction was at the angle of 450 to the slow axis (measured at 632.8 nm) of the cellulose acetate film.

(Formation of Optically Anisotropic Layer)

To prepare a coating solution, 41.01 g of the discotic (liquid crystal) compound used in Example 1, 4.06 g of ethylene oxide denatured trimethlolpropanetriacrylate (V#360, Osaka Organic Chemicals Co., Ltd.), 0.90 g of cellulose acetate butyrate (CAB-551-0.2, Eastman Chemical), 0.23 g of cellulose acetate butyrate (CAB-551-1, Eastman Chemical), 1.35 g of a photopolymerization initiator (Irgacure 907, Ciba-Geigy) and 0.45 g of a sensitizer (Kayacure DETX, Nippon Kayaku Co., Ltd.) were dissolved in 102 g of methyl ethyl ketone. The coating solution was then applied on the orientation layer by means of a wire bar coater of #3. The thus-treated film was fixed on a metal frame, and maintained in a thermostat at 130° C. for 2 minutes to align the molecules of the discotic compound. The film was then irradiated at 130° C. for 1 minute with an ultraviolet ray emitted from a high pressure mercury lamp of 120 W/cm, so as to polymerize the discotic compound. The film was cooled to room temperature. Thus, an optically anisotropic layer was formed.

The Re retardation value was measured at 633 nm, and found 38 nm. The average angle (inclined angle) between the discotic plane and the transparent support (cellulose acetate film) was 400.

The defects in the alignment was counted in the same manner as in Example 1. As a result, the defects of 70 Pm or more were found 2.3 per 1 m².

EXAMPLE 3

Iodine was adsorbed on a stretched polyvinyl alcohol film to prepare a polarizing membrane. The cellulose triacetate film prepared in Example 1 was then laminated on one surface of the polarizing membrane with a polyvinyl alcohol adhesive. On the other surface of the membrane, a commercially available cellulose triacetate film [Fujitac TD80UF, Fuji Photo Film Co., Ltd.] was saponified and laminated. The layered film was dried at 80° C. for 10 minutes.

The transparent axis of the polarizing membrane was placed parallel to the slow axis of the optical compensatory sheet prepared in Example 1 and perpendicular to the slow axis of the commercially available cellulose triacetate film. Thus, a polarizing plate was prepared.

EXAMPLE 4

The procedure of Example 3 was repeated except that the optical compensatory sheet prepared in Example 2 was used and placed so that the slow axis of the sheet might be at the angle of 45° to the transparent axis of the polarizing membrane.

COMPARISON EXAMPLE 2

Iodine was adsorbed on a stretched polyvinyl alcohol film to prepare a polarizing membrane. The optical compensatory sheet in Comparison Example 1 was then laminated on one surface of the polarizing membrane with a polyvinyl alcohol adhesive. On the other surface of the membrane, a commercially available polycarbonate film [Teijin Ltd.] was laminated. The layered film was then dried at 80° C. for 30 minutes. The resultant film polarized light insufficiently so that it could not serve as a polarizing plate.

EXAMPLE 5
(Preparation of Liquid Crystal Cell of Bend Alignment)

On a glass plate having an ITO electrode, an orientation layer of polyimide was provided and subjected to a rubbing treatment. This procedure was repeated to prepare two substrates, and the substrates were arranged face-to-face so that the rubbing directions might be parallel and that the cell gap might be 6 $\mu$m. Between them, a liquid crystal having An of 0.1396 (ZLI1132, Merck & Co., Inc.) was introduced to prepare a liquid crystal cell of bend alignment.

Two elliptically polarizing plates prepared in Example 4 were laminated on the liquid crystal cell so that the cell might be between the plates. The plates were arranged so that the optically anisotropic layer in each plate might face to the cell substrate and that the rubbing directions of the cell and the optically anisotropic layer might be reversely parallel.

Voltage of a square wave (55 Hz) was applied to the liquid crystal cell. An image was displayed according to normally white mode (white: 2V, black: 5V). A ratio of the transmittance (white/black) was measured as a contrast ratio. The upward, downward, and leftward-rightward contrast ratios were measured by means of a meter (EZ-Contrast 160D, ELDIM), and the viewing angle giving a contrast ratio of not smaller than 10 (without tone inversion in black displaying) along each direction of upward (U), downward (D), and leftward-rightward (L-R) was measured at eight displaying states of Ll (full black) to L8 (full white). The results are set forth in Table 1.

TABLE 1

| | Viewing angle | | |
|---|---|---|---|
| | U | D | L-R |
| Example 5 | 80° | 80° | 160° |

Remark:
Tone inversion in black displaying was observed between L1 and L2.

EXAMPLE 6

From a commercially available liquid crystal display having a liquid crystal cell of TN mode [6E-A3, Sharp Corporation], a pair of polarizing plates were peeled. In place of them, the polarizing plates prepared in Example 3 were laminated on the cell with an adhesive. Onto each of the observer's side and the backlight side of the cell, each plate was placed so that the cellulose acetate film prepared in Example 1 might face to the cell. The polarizing plate on the observer's side and that on the backlight side were arranged so that their transparent axes might be perpendicular to each other.

With respect to the prepared liquid crystal display, the viewing angle was measured at eight displaying states of Li (full black) to L8 (full white) by means of a meter (EZ-Contrast 160D, ELDIM). The results are set forth in Table 2.

COMPARISON EXAMPLE 4

With respect to a commercially available liquid crystal display having a liquid crystal cell of TN mode [6E-A3, Sharp Corporation], the viewing angle was measured at eight displaying states of L1 (full black) to L8 (full white) by means of a meter (EZ-Contrast 160D, ELDIM). The results are set forth in Table 2.

TABLE 2

|  | Viewing angle | | |
| --- | --- | --- | --- |
|  | U | D | L–R |
| Example 6 | 70° | 45° | 160° |
| Comp. Example 4 | 15° | 25° | 74° |

Remark:
Tone inversion in black displaying was observed between L1 and L2.

EXAMPLE 7

A cellulose acetate film was prepared in the same manner as in Example 1.

The retardation values of Re and Rth of the obtained cellulose acetate film were measured at 633 nm by means of an ellipsometer [M-150, JASCO], and thereby the values of Re (along the stretched direction) and Rth were found 10 nm and 81 nm, respectively.

On the cellulose acetate film, an undercoating layer was formed in the same manner as in Example 1.
(Formation of Orientation Layer)

A coating solution of the following composition was coated on the above-formed gelatin layer on the cellulose acetate film by means of a wire bar coater of #20. The coating amount was 35 ml/m$^2$. As the polymer for the orientation layer, a denatured polyvinyl alcohol (polymerization degree: 350) and a polyvinyl alcohol (polymerization degree: 1,700) [PVA217, Kuraray Ltd.] were used. The coated layer was dried with air at 60° C. for 60 seconds, further air dried at 90° C. for 150 seconds.

| Coating solution for orientation layer | |
| --- | --- |
| The denatured polyvinyl alcohol used in Example 1 | 16 weight parts |
| A polyvinyl alcohol [PVA217, Kuraray Ltd.] | 4 weight parts |
| Water | 363 weight parts |
| Methanol | 117 weight parts |
| Glutaric aldehyde (cross-linking agent) | 0.5 weight part |

The formed orientation layer had a thickness of 0.8 μm. The surface roughness (Ra) of the formed orientation layer was measured by means of an AFM (atomic force microscope) [SPI3800N, Seiko Epson Instruments Co., Ltd.], and thereby it was found 1.5 nm. The orientation layer was then subjected to a rubbing treatment in which the rubbing direction was parallel to the slow axis (measured at 632.8 nm) of the cellulose acetate film.
(Formation of Optically Anisotropic Layer)

An optically anisotropic layer was formed in the same manner as in Example 1.

The Re retardation value of the optically anisotropic layer was measured at 633 nm, and found 48 nm. The average angle (inclined angle) between the discotic plane and the transparent support (cellulose acetate film) was 42°.

COMPARISON EXAMPLE 5

A coating solution of the following composition was coated on the gelatin layer on the cellulose acetate film prepared in Example 7 by means of a wire bar coater of #16. The coating amount was 28 ml/m$^2$. As the polymer for the orientation layer, a denatured polyvinyl alcohol (polymerization degree: 300) [MP203, Kuraray Ltd.] was used. The coated layer was dried with air at 60° C. for 60 seconds, further air dried at 90° C. for 150 seconds.

| Coating solution for orientation layer | |
| --- | --- |
| A denatured polyvinyl alcohol [MP203, Kuraray Ltd.] | 10 weight parts |
| Water | 371 weight parts |
| Methanol | 119 weight parts |
| Glutaric aldehyde (cross-linking agent) | 0.5 weight part |

The formed orientation layer had a thickness of 0.5 μm. The surface roughness (Ra) of the formed orientation layer was measured by means of an AFM, and thereby it was found 3.2 nm. The prepared orientation layer was then subjected to a rubbing treatment in which the rubbing direction was parallel to the slow axis (measured at 632.8 nm) of the cellulose acetate film.
(Formation of Optically Anisotropic Layer)

An optically anisotropic layer was formed in the same manner as in Example 1.

The Re retardation value of the optically anisotropic layer was measured at 633 nm, and found 48 nm. The average angle (inclined angle) between the discotic plane and the transparent support (cellulose acetate film) was 420, which was the same as that in Example 1.

EXAMPLE 8

The procedure of Example 1 was repeated except that the retardation increasing agent was incorporated in the amount of 3.0 weight parts based on 100 weight parts of cellulose acetate, to prepare a dope. The dope was cast on a band to form a film in which the solvent remained in the amount of 15 wt. %. The film was laterally stretched by 30% at 130° C. by means of a tenter. Thus, a cellulose acetate film (thickness: 80 μm) was prepared.

The retardation values of Re and Rth of the obtained cellulose acetate film were measured at 633 nm by means of an ellipsometer [M-150, JASCO], and thereby the values of Re (along the stretched direction) and Rth were found 20 nm and 130 nm, respectively.

A undercoating layer was formed on the above-prepared cellulose acetate film in the same manner as in Example 1.
(Formation of Orientation Layer)

A coating solution of the following composition was coated on the gelatin layer on the cellulose acetate film by means of an E coater. The coating amount was 60 ml/m$^2$. As the polymer for the orientation layer, a denatured polyvinyl alcohol (polymerization degree: 500) and a polyvinyl alcohol (polymerization degree: 1,700) [PVA117, Kuraray Ltd.] were used. The coated layer was dried with air at 60° for 60 seconds, and further air dried at 90° C. for 150 seconds.

| Coating solution for orientation layer | |
|---|---|
| The following denatured polyvinyl alcohol | 8.5 weight parts |
| Polyvinyl alcohol (PVA117, kuraray Co., Ltd.) | 1.5 weight part |
| Water | 371 weight parts |
| Methanol | 119 weight parts |
| Glutaric aldehyde (cross-linking agent) | 0.5 weight part |

Denatured Polyvinyl Alcohol

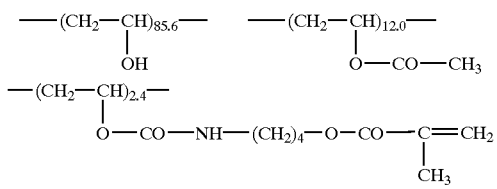

The formed orientation layer had a thickness of 1.0 μm. The surface roughness (Ra) of the orientation layer was measured by means of an AFM (atomic force microscope) [SPI3800N, Seiko Epson Instruments Co., Ltd.], and thereby it was found 1.3 nm. The orientation layer was then subjected to a rubbing treatment in which the rubbing direction was at the angle of 45° to the slow axis (measured at 632.8 nm) of the cellulose acetate film.

(Formation of Optically Anisotropic Layer)

An optically anisotropic layer was formed on the orientation layer in the same manner as in Example 2.

The Re retardation value was measured at 633 nm, and found 38 nm. The average angle (inclined angle) between the discotic plane and the transparent support (cellulose acetate film) was 40°.

EXAMPLE 9

Iodine was adsorbed on a stretched polyvinyl alcohol film to prepare a polarizing membrane. The cellulose triacetate film prepared in Example 7 was then laminated on one surface of the polarizing membrane with a polyvinyl alcohol adhesive. On the other surface of the membrane, a commercially available cellulose triacetate film [Fujitac TD80UF, Fuji Photo Film Co., Ltd.] was saponified and laminated. The layered film was dried at 80° C. for 10 minutes.

The transparent axis of the polarizing membrane was placed parallel to the slow axis of the optical compensatory sheet prepared in Example 7 and perpendicular to the slow axis of the commercially available cellulose triacetate film. Thus, a polarizing plate was prepared.

EXAMPLE 10

The procedure of Example 9 was repeated except that the optical compensatory sheet prepared in Example 8 was used and placed so that the slow axis of the sheet might be at the angle of 45° to the transparent axis of the polarizing membrane.

COMPARISON EXAMPLE 6

Iodine was adsorbed on a stretched polyvinyl alcohol film to prepare a polarizing membrane. The optical compensatory sheet in Comparison Example 5 was then laminated on one surface of the polarizing membrane with a polyvinyl alcohol adhesive. On the other surface of the membrane, a commercially available polycarbonate film [Teijin Ltd.] was laminated. The layered film was then dried at 80° C. for 30 minutes. The resultant film polarized light insufficiently so that it could not serve as a polarizing plate.

EXAMPLE 11

(Evaluation on Reworkability)

Each of the polarizing plates obtained in Examples 9 and 10 and Comparison Example 6 was laminated on a glass plate with an adhesive, and then aged at 50° C. under 5 atm for 6 hours. Each aged polarizing plate was then peeled from the glass plate under the conditions of 25° C. and 60% RH, and it was observed whether the optically anisotropic layer partially remained or not. The results are set forth in Table 3.

TABLE 3

| | Number of tested plates | Number of partially remaining plates |
|---|---|---|
| Example 9 | 100 | 0 |
| Example 10 | 100 | 0 |
| Comp. Example 6 | 100 | 50 |

EXAMPLE 12

(Preparation of Liquid Crystal Cell of Bend Alignment)

On a glass plate having an ITO electrode, an orientation layer of polyimide was provided and subjected to a rubbing treatment. This procedure was repeated to prepare two substrates, and the substrates were arranged face-to-face so that the rubbing directions might be parallel and that the cell gap might be 6 μm. Between them, a liquid crystal having An of 0.1396 (ZLI1132, Merck & Co., Inc.) was introduced to prepare a liquid crystal cell of bend alignment.

Two elliptically polarizing plates prepared in Example 10 were laminated on the liquid crystal cell so that the cell might be between the plates. The plates were arranged so that the optically anisotropic layer in each plate might face to the cell substrate and that the rubbing directions of the cell and the optically anisotropic layer might be reversely parallel.

Voltage of a square wave (55 Hz) was applied to the liquid crystal cell. An image was displayed according to an normally white mode (white: 2V, black: 5V). A ratio of the transmittance (white/black) was measured as a contrast ratio. The upward, downward, leftward and rightward contrast ratios were measured by means of a meter (EZ-Contrast 160D, ELDIM), and the viewing angle giving a contrast ratio of not smaller than 10 (without tone inversion in black displaying) along each direction of upward (U), downward (D), leftward and rightward (L-R) was measured at eight displaying states of L1 (full black) to L8 (full white).

The results are set forth in Table 4.

TABLE 4

| | Viewing angle | | |
|---|---|---|---|
| | U | D | L-R |
| Example 12 | 80° | 80° | 160° |

Remark:
Tone inversion in black displaying was observed between L1 and L2.

EXAMPLE 13

From a commercially available liquid crystal display having a liquid crystal cell of TN mode [6E-A3, Sharp Corporation], a pair of polarizing plates were peeled. In place of them, the polarizing plates prepared in Example 9 were laminated on the cell with an adhesive. Onto each of the observer's side and the backlight side of the cell, each plate was placed so that the cellulose acetate film prepared in Example 7 might face to the cell. The polarizing plate on the observer's side and that on the backlight side were arranged so that their transparent axes might be perpendicular to each other.

With respect to the prepared liquid crystal display, the viewing angle was measured at eight displaying states of LI (full black) to L8 (full white) by means of a meter (EZ-Contrast 160D, ELDIM). The results are set forth in Table 5.

COMPARISON EXAMPLE 7

With respect to a commercially available liquid crystal display having a liquid crystal cell of TN mode [6E-A3, Sharp Corporation], the viewing angle was measured at eight displaying states of Li (full black) to L8 (full white) by means of a meter (EZ-Contrast 160D, ELDIM). The results are set forth in Table 5.

TABLE 5

|  | Viewing angle | | |
| --- | --- | --- | --- |
|  | U | D | L–R |
| Example 13 | 70° | 45° | 160° |
| Comp. Example 7 | 15° | 25° | 74° |

Remark:
Tone inversion in black displaying was observed between L1 and L2.

I claim:
1. An optical compensatory sheet which comprises a transparent support, an orientation layer and an optically anisotropic layer formed by polymerizing or cross-linking a liquid crystal compound, arranged in that order, wherein the orientation layer has a surface roughness of 0.1 to 2.0 nm.

2. The optical compensatory sheet as defined in claim 1, wherein the optically anisotropic layer is formed by polymerizing or cross-linking the liquid crystal compound by heat or light.

3. The optical compensatory sheet as defined in claim 1, wherein the orientation layer is formed by subjecting a rubbing treatment to a layer comprising a cross-linked polymer.

4. The optical compensatory sheet as defined in claim 1, wherein the orientation layer is formed by subjecting a rubbing treatment to a layer comprising polyvinyl alcohol or a denatured polyvinyl alcohol.

5. The optical compensatory sheet as defined in claim 4, wherein the denatured polyvinyl alcohol is denatured with a compound represented by the formula (I):

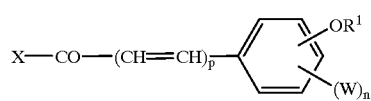

(I)

in which $R^1$ is an alkyl group, an acryloylalkyl group, a ethacryloylalkyl group or an epoxyalkyl group; W is a halogen atom, an alkyl group or an alkoxy group; X is an atomic group forming an active ester, an acid anhydride or n acid halide; p is 0 or 1; and n is 0, 1, 2, 3 or 4.

6. The optical compensatory sheet as defined in claim 1, wherein the orientation layer is formed by subjecting a rubbing treatment to a layer comprising at least two polymers, at least one of which is cross-linked.

7. The optical compensatory sheet as defined in claim 6, wherein the two polymers are different in polymerization degree of 50 or more.

8. The optical compensatory sheet as defined in claim 7, wherein one of the two polymers has a polymerization degree of 100 to 500, and the other has a polymerization degree of 750 to 2,000.

9. The optical compensatory sheet as defined in claim 7, wherein a weight ratio of the polymer having a lower polymerization degree to the polymer having a higher polymerization degree is in the range of 50:50 to 99.8:0.2.

10. The optical compensatory sheet as defined in claim 7, wherein one of the two polymers is polyvinyl alcohol, and the other is a denatured polyvinyl alcohol.

11. The optical compensatory sheet as defined in claim 6, wherein each of the polymers is polyvinyl alcohol or a denatured polyvinyl alcohol.

12. The optical compensatory sheet as defined in claim 6, wherein at least one of the polymers is a polyvinyl alcohol denatured with a compound represented by the formula (I):

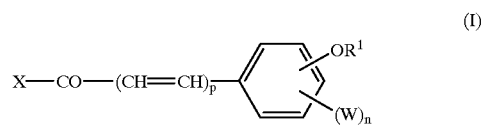

(I)

in which $R^1$ is an alkyl group, an acryloylalkyl group, a methacryloylalkyl group or an epoxyalkyl group; W is a halogen atom, an alkyl group or an alkoxy group; X is an atomic group forming an active ester, an acid anhydride or an acid halide; p is 0 or 1; and n is 0, 1, 2, 3 or 4.

13. The optical compensatory sheet as defined in claim 1, wherein the transparent support is a polymer film having a retardation in plane in the range of 20 to 200 nm, and a retardation along thickness direction in the range of 70 to 400 nm.

14. The optical compensatory sheet as defined in claim 13, wherein the polymer film is formed from a cellulose acetate having an acetic acid content in the range of 59.0 to 61.5% and an aromatic compound having at least two aromatic rings in an amount of 0.01 to 20 weight parts based on 100 weight parts of the cellulose acetate.

15. A liquid crystal display comprising a liquid crystal cell and two polarizing plates placed on both sides of the cell, wherein at least one of the polarizing plates is the ellipsoidal polarizing plate defined in claim 13, said ellipsoidal polarizing plate being so placed that the side of the optical compensatory sheet faces the liquid crystal cell.

16. The liquid crystal display as defined in claim 15, wherein the liquid crystal cell is a cell of an OCB mode or a TN mode.

17. The optical compensatory sheet as defined in claim 1, wherein the liquid crystal compound is a discotic compound.

18. The optical compensatory sheet as defined in claim 17, wherein the optically anisotropic layer is formed by polymerizing or cross-linking the discotic liquid crystal compound by heat or light.

19. An ellipsoidal polarizing plate comprising a polarizing membrane and an optical compensatory sheet laminated on at least one surface of the polarizing membrane, wherein the optical compensatory sheet comprises a transparent support, an orientation layer and an optically anisotropic layer formed by polymerizing or cross-linking a liquid crystal compound, arranged in that order, wherein the transparent support is a polymer film having a retardation in plane in the range of 20 to 200 nm, and a retardation along thickness direction in the range of 70 to 400 nm, and wherein the orientation layer has a surface roughness of 0.1 to 2.0 nm.

20. The ellipsoidal polarizing plate as defined in claim 19, wherein the polymer film is formed from a cellulose acetate having an acetic acid content in the range of 59.0 to 61.5% and an aromatic compound having at least two aromatic rings in an amount of 0.01 to 20 weight parts based on 100 weight parts of the cellulose acetate.

* * * * *